May 27, 1924.　　　　　　　　　　　　　　1,495,786
T. M. FINLEY ET AL
TANDEM COUPLING AND GEAR MECHANISM
Original Filed Jan. 14, 1920　4 Sheets-Sheet 2

Inventors
T. M. Finley.
A. W. Brown.
By Harry F. Riley Attorney

May 27, 1924.

T. M. FINLEY ET AL 1,495,786

TANDEM COUPLING AND GEAR MECHANISM

Original Filed Jan. 14, 1920   4 Sheets-Sheet 3

Inventors
T. M. Finley.
A. W. Brown.

By Harry T. Riley Attorney

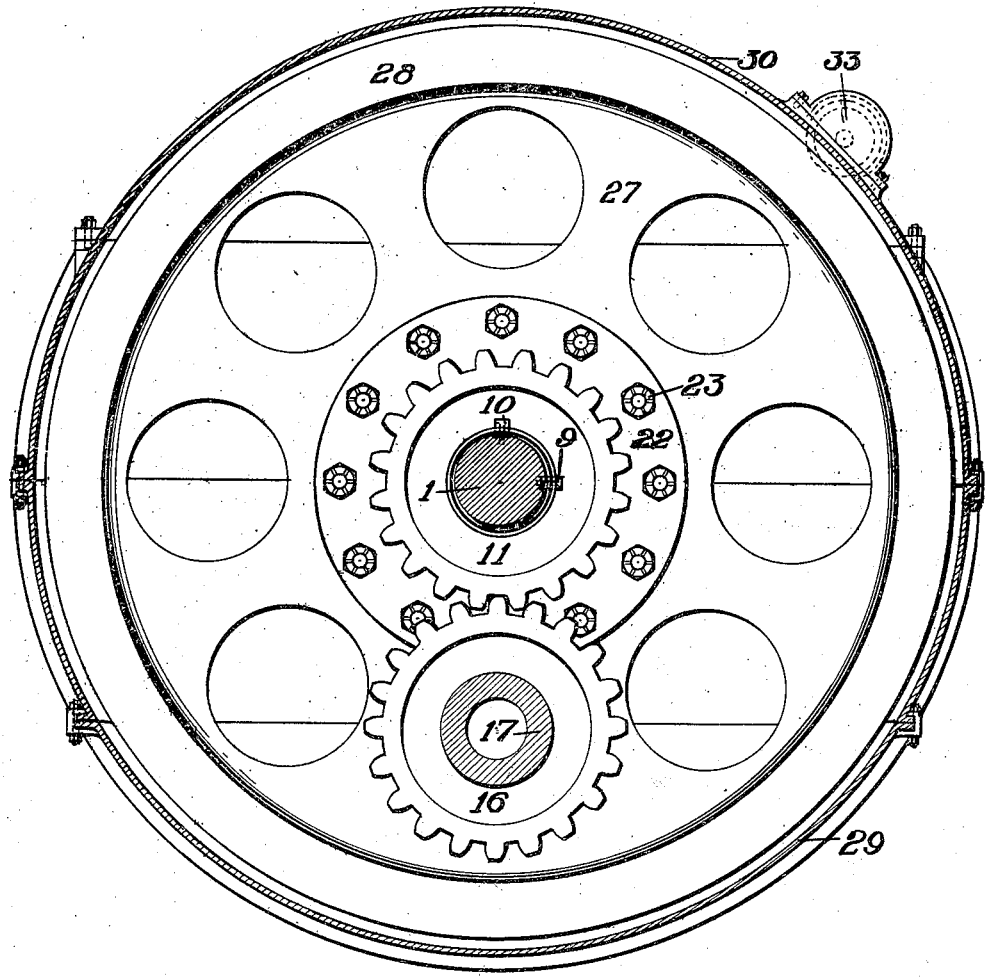

Patented May 27, 1924.

1,495,786

UNITED STATES PATENT OFFICE.

THOMAS MILTON FINLEY AND ALLEN W. BROWN, OF ST. LOUIS, MISSOURI.

TANDEM COUPLING AND GEAR MECHANISM.

Original application filed January 14, 1920, Serial No. 351,346. Divided and this application filed January 14, 1920. Serial No. 351,350.

*To all whom it may concern:*

Be it known that we, THOMAS M. FINLEY and ALLEN W. BROWN, citizens of the United States, residing at St. Louis, in the county of St. Louis City and State of Missouri, have invented certain new and useful Improvements in Tandem Coupling and Gear Mechanism, of which the following is a specification.

The invention relates to a tandem coupling and gear mechanism for tandem engines and is a division of an application filed by us the 14th day of January, 1920.

The object of the present invention is to provide a simple, practical and efficient tandem coupling and gear mechanism of strong and durable construction designed for coupling the longitudinally arranged front and rear engine sections of the tandem motor power unit of the said application and capable of securely connecting the adjacent ends of the crank shafts of the said front and rear engine sections and of enabling the power to be taken from the tandem motor power unit centrally thereof and transmitted to one end of the power unit, whereby the excessive strains incident to the employment of a single long continuous crank shaft and the taking of the power from one end of the same are eliminated.

A further object of the invention is to provide a tandem coupling and gear mechanism of this character adapted to perform the functions of a fly or balance wheel and capable of enabling a starting device of the standard type to be connected with the tandem motor power unit centrally thereof.

It is also an object of the invention to provide a tandem coupling and gear mechanism for tandem motor power units adapted to be completely encased and to run in oil so as to be thoroughly lubricated.

Another object of the invention is to provide a tandem coupling adapted to be readily separated and assembled and capable of affording ready access to its component elements and of also permitting the engine sections of the tandem motor power unit to be easily coupled and uncoupled.

With these and other objects in view, the invention consists in the construction and novel combination and arrangement of parts hereinafter fully described, illustrated in the accompanying drawings and pointed out in the claims hereto appended, it being understood that various changes in the form, proportion, and minor details of construction within the scope of the claims may be resorted to without departing from the spirit or sacrificing any of the advantages of the invention.

In the drawings, in which like characters of reference designate corresponding parts in the several figures:

Figure 4 is a similar view on the line 4—4 of Figure 1.

Figure 1:
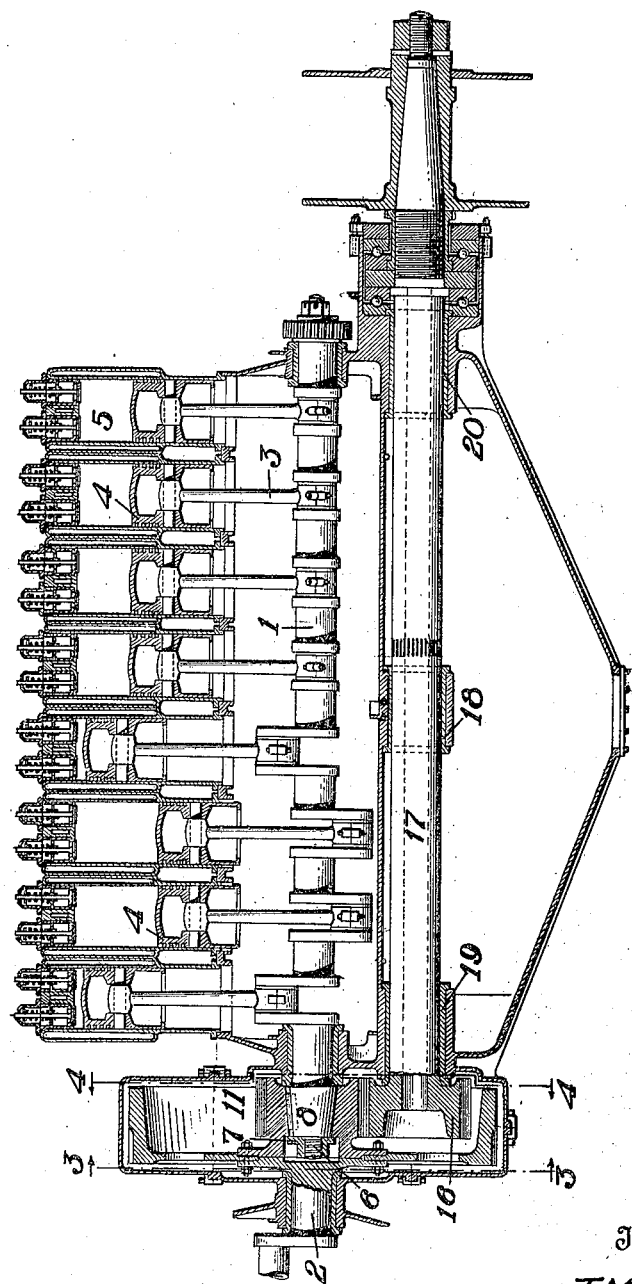
Figure 1 is a longitudinal sectional view of a portion of the tandem motor power unit provided with a coupling and gear mechanism constructed in accordance with this invention.

The tandem motor power unit of the aforesaid application is composed of front and rear engine sections each consisting of two sets of four cylinders, the sixteen cylinders being arranged in longitudinal alignment as clearly indicated in Figure 1 of the drawing and as fully disclosed in the aforesaid application. The front and rear engine sections are provided with longitudinally aligned crank shafts 1 and 2, the front crank shaft 1 being shown connected by connecting rods 3 with piston 4 located above the crank shaft and operating in vertical cylinders 5. The engine section has its cylinders (not shown) arranged in a similar manner and an illustration thereof is omitted to avoid duplication.

Figure 2:
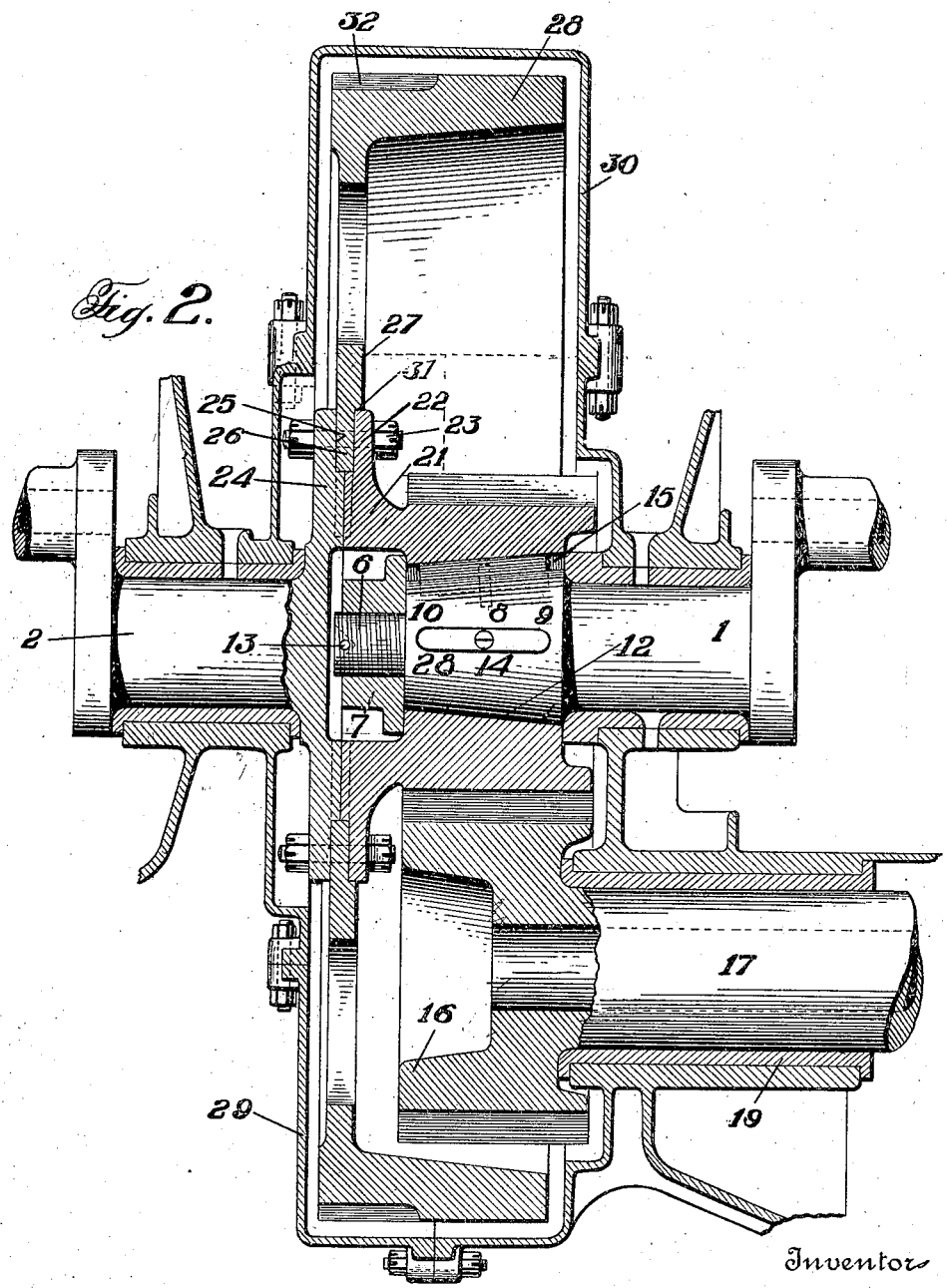
Figure 2 is an enlarged longitudinal sectional view of the coupling and gear mechanism.
Figure 3:
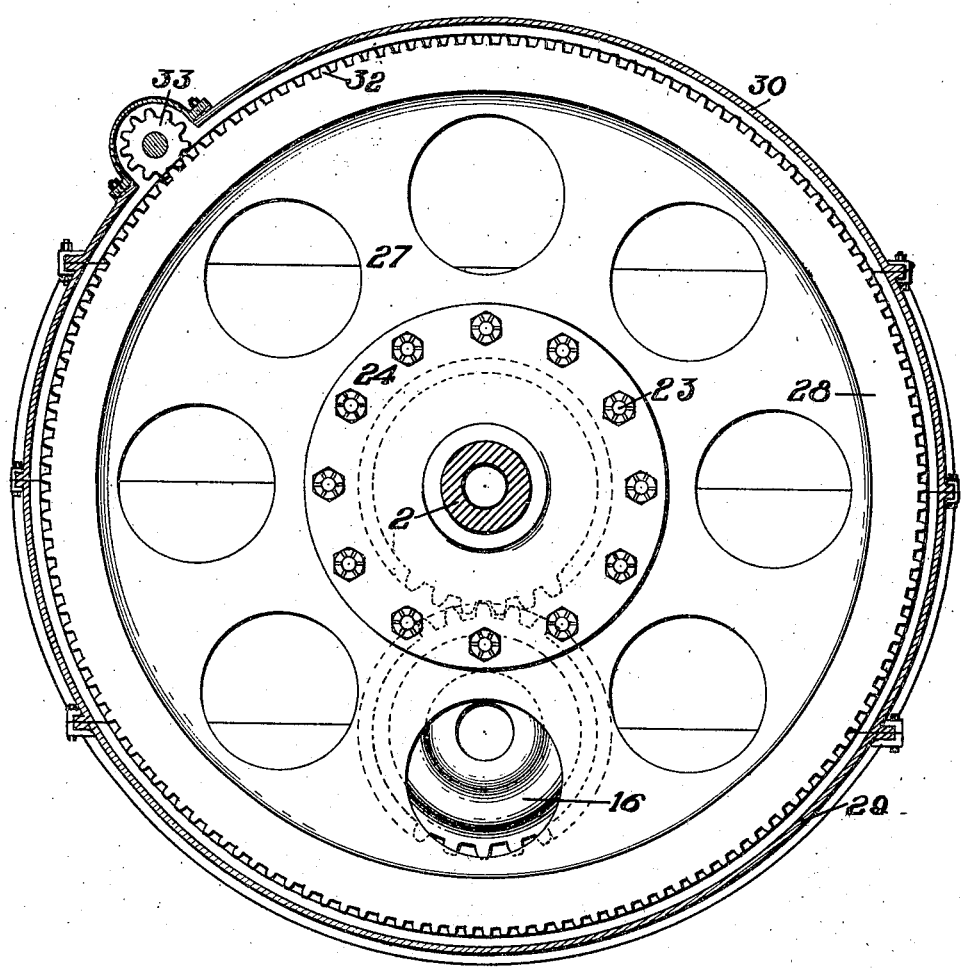
Figure 3 is a transverse sectional view on the line 3—3 of Figure 1.

The inner end of the crank shaft 1 is threaded at 6 to receive a nut 7 and it is provided adjacent to its threaded end with a smooth tapered portion 8, grooved at 9 to receive keys 10 for keying a crank shaft pinion or gear 11 to the inner end of the crank shaft 1. The crank shaft pinion 11 has a tapered bore or opening 12 in its hub to fit the tapered portion 8 of the crank shaft 1 and it is retained in place by the nut 7 which is secured against accidental rotation on the crank shaft by means of a cotter pin 13 or other suitable fastening device. The groove 9 in the smooth tapered portion 8 of the crank shaft 1 terminates short of the ends of the said tapered portions and the key 10 of each groove is preferably secured in the recess 9 by a screw 14. The groove 15 for each of the keys 10 extends the entire length of the hub of the crank gear or pinion 11 as clearly shown in Figure 2 of the drawing. The crank shaft gear is adapted to be readily placed on and removed from the smooth tapered portion of crank shaft 1 when it is unfastened and free to move outward with respect to the tapered portion 8.

The crank shaft gear 11 which transmits the power of the tandem motor power unit centrally thereof and at the point of connection of the longitudinally aligned crank shafts 1 and 2, meshes with a pinion or gear 16 of a propeller shaft 17 constituting a power transmission shaft and extending from the inner end of the front engine section to the outer end thereof and located beneath and in parallelism with the crank shaft 1 and journaled in central and end bearings 18, 19 and 20. The power transmission pinion or gear 11 constitutes an element of the coupling means for connecting the separate front and rear crank shafts 1 and 2 of the engine sections, and it is provided with an extended hub portion 21 forming a recess or housing for the nut 7 and provided with an annular attaching flange 22 which is secured by bolts 23 to a corresponding attaching flange 24 formed integral with and extending from the inner end of the crank shaft 2 of the rear engine section. The attaching flanges 22 and 24 which have abutting inner faces are provided at the outer portions of their inner abutting faces with peripheral or circumferential recesses 25 for the reception of a reduced inner portion 26 of a web 27 of a fly-wheel rim 28. The fly-wheel rim 28 which constitutes a fly-wheel or balance wheel for the tandem motor power unit, extends inwardly or forwardly from the web 27, and the crank shaft transmission gear 11 and the pinion or gear of the propeller shaft 17 are arranged within the fly-wheel rim as clearly shown in Figure 2 of the drawings. The gearing is protected by a sectional housing 29 preferably divided vertically and horizontally as fully shown and described in the said application and as clearly indicated in Figures 1 and 2. This sectional housing 29 is provided with a removable cap 30.

The fly-wheel and the flanges of the crank shafts 1 and 2 are firmly and detachably connected together by the said bolts 23, the reduced portion 26 of the web 27 forming a shoulder 31 which fits against the periphery of the annular attaching flange of the crank shaft gear 11. By employing the front and rear engine sections and dividing the crank shaft of the tandem motor power unit centrally of the latter and taking the power centrally of the said unit the crank shafts are relieved of excessive torsional strain and a much lighter and more durable and efficient power unit is thereby produced and the size and weight and consequently the ratio of the mass to the power is materially reduced and it is evident that a much heavier continuous shaft would be required for sustaining the strains and transmitting the power of 16 cylinders arranged in longitudinal alignment than is employed in the separately coupled front and rear engine sections. Also it will be apparent that this is rendered practical by the taking of the power from the coupled ends of the crank shafts instead of from the outer end of one of the crank shafts. The tandem motor power unit is especially adapted for aeronautical purposes and while a propeller shaft is illustrated in the accompanying drawings, the tandem motor power unit may be advantageously employed for any purpose and the longitudinal shaft 17 will constitute a power transmission shaft for delivering the power to one end of the tandem motor power unit.

The rim of the fly-wheel is provided with spur teeth 32 preferably cut in the said rim 28 and adapted to mesh with a pinion 33 of a suitable starting device of the standard type such as shown and described in the said application. The starting device which may be of any desired construction operates in the usual manner to rotate the fly-wheel rim and the crank shafts and as soon as the engine sections of the tandem motor power unit take up their cycle the starting device is automatically thrown out of gear in the usual well known manner. A starting device is mounted on the sectional casing but may be supported in any other desired manner.

What is claimed is:

1. In a tandem motor power unit, the combination of front and rear engine sections having aligned crank shafts, and coupling gearing including a pinion or gear interlocked with one of the crank shafts, means for connecting said pinion with the other crank shaft, a shaft having a gear meshing with the said pinion or gear for transmitting the power therefrom and a fly wheel connected with and housing said gearing.

2. In a tandem motor power unit, the combination of front and rear engine sections having aligned crank shafts, gearing coupling the crank shafts together and having means for taking the power of the tandem motor power unit from the inner adjacent ends of the crank shafts and a fly wheel connected with and housing said gearing.

3. In a tandem motor power unit, the combination of front and rear engine sections having aligned crank shafts, a pinion or gear carried by the inner end of one of the crank shafts, means for coupling the other crank shaft to the said pinion or gear, a fly-wheel connected with the said pinion or gear, and gearing located within the periphery of the fly wheel and meshing with the said pinion or gear for taking the power of the tandem motor power unit from the inner ends of the crank shafts.

4. In a tandem motor power unit, the combination of front and rear engine sections having aligned crank shafts, a pinion or gear mounted on the inner end of one of the crank shafts, means for coupling the other crank shaft to the said pinion or gear, a fly-wheel connected with the said pinion or gear and having a rim extending over the said pinion or gear and a shaft having a pinion or gear also located within the rim and meshing with the pinion or gear of the crank shaft.

5. In a tandem motor power unit, the combination of front and rear engine sections having aligned crank shafts, coupling gearing including a pinion or gear carried by the inner end of one of the crank shafts, a gear meshing with the said pinion or gear for transmitting power form the inner ends of the crank shafts and a fly-wheel connected with the inner ends of the crank shafts and having a rim housing the said pinion or gear and the gear meshing therewith.

6. In a tandem motor power unit, the combination of front and rear engine sections having aligned crank shafts, and coupling gearing including a pinion slidably interlocked with one of the crank shafts and having a laterally extending attaching portion, the other crank shaft being also provided with a laterally extending attaching portion, means for securing said attaching portions together in abutting relation and a pinion or gear meshing with the said pinion or gear for taking the power from the inner ends of the crank shafts.

7. In a tandem motor power unit the combination of front and rear engine sections having alined crank shafts one of the crank shafts having a fixed projecting attaching portion, a pinion mounted upon the other crank shaft and having a projecting attaching portion secured to the said attaching portion, fastening means housed within said attaching portions for securing the pinion on its crank shaft and means for transmitting motion from said pinion.

8. In a tandem motor power unit, the combination of front and rear engine sections having aligned crank shafts, one of the crank shafts being provided with a tapered portion at its inner end and having a threaded terminal, a pinion or gear mounted on the tapered portion of the said crank shaft and having a projecting attaching portion, a nut engaging the threaded terminal of the crank shaft and arranged within the said projecting portion of the pinion or gear, means for securing the other crank shaft to the latter, and means for transmitting motion from the said pinion or gear.

9. In a tandem motor power unit, the combination of front and rear engine sections having aligned crank shafts, a pinion or gear carried by the inner end of one of the crank shafts, the other crank shaft and the said pinion or gear having abutting attaching portions, a fly-wheel having a web located at the said attaching portions, means for securing the said attaching portions together and to the said web, and means for transmitting motion from the said pinion or gear.

10. In a tandem motor power unit, the combination of front and rear engine sections having aligned crank shafts, one of the crank shafts being provided at its inner end with an attaching portion, a pinion or gear carried by the inner end of the other crank shaft and having an attaching portion located at the said attaching portion, a fly-wheel having a web extending between the said attaching portions, means for securing the attaching portions and the web together and means for transmitting motion from the pinion or gear.

In testimony whereof we affix our signatures.

THOMAS MILTON FINLEY.
ALLEN W. BROWN.